(12) United States Patent
Aratake et al.

(10) Patent No.: US 6,336,604 B1
(45) Date of Patent: Jan. 8, 2002

(54) FISHING LINE GUIDE MECHANISM FOR A SPINNING REEL

(75) Inventors: Seiichi Aratake, Shizuoka; Yuzo Kawabe, Izumi; Taisei Morise; Hirokazu Hirayama, both of Sakai, all of (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/680,934

(22) Filed: Oct. 10, 2000

Related U.S. Application Data

(63) Continuation of application No. 09/190,150, filed on Nov. 12, 1998, now abandoned.

(51) Int. Cl.$^7$ ................................................. A01K 89/01
(52) U.S. Cl. ......................................................... 242/231
(58) Field of Search ................................. 242/230, 231, 242/232, 233, 234, 157 R, 150 R, 615.1, 615.2, 615.4; D22/140, 141

(56) References Cited

U.S. PATENT DOCUMENTS

| | | | | |
|---|---|---|---|---|
| 5,261,627 A | * | 11/1993 | Shinohara | 242/231 |
| 5,560,561 A | * | 10/1996 | Henriksson | 242/231 |
| 5,769,344 A | * | 6/1998 | Kaneko et al. | 242/231 |
| 5,839,681 A | * | 11/1998 | Kaneko | 242/231 |
| 5,991,377 A | * | 6/1999 | Jung | 242/231 |
| 6,149,087 A | * | 11/2000 | Takeuchi | 242/231 |
| 6,161,786 A | * | 12/2000 | Ohara et al. | 242/231 |
| 6,220,537 B1 | * | 4/2001 | Amano et al. | 242/231 |

FOREIGN PATENT DOCUMENTS

| | | |
|---|---|---|
| DE | 196 19 714 A | 12/1996 |
| EP | 0 681 784 A2 | 11/1995 |

* cited by examiner

Primary Examiner—William A. Rivera
(74) Attorney, Agent, or Firm—Shinjyu Global IP Counselors, LLP

(57) ABSTRACT

A line guide mechanism (8) for a spinning reel is provided with the stationary shaft cover (21) and the line roller (23) for guiding a fishing line (L) to a spool (4). The stationary shaft (20) is fixed at one end to a bail support member (7). The stationary shaft cover (21) is fixed to the other end of the stationary shaft (20) at an interval with the bail support member (7). The line roller (23) is rotatably supported to the stationary shaft (20) between the bail support member (7) and the stationary shaft cover (21) for guiding the fishing line to the spool when the fishing line is wound. A line guide surface (34d) is formed on a circumferential surface of the line roller (23) so that a diameter is increased on the side of the stationary cover (21). The fishing line is displaced on the side of the line guide surface (34d) while being guided by the line roller (23) when the fishing line is wound. Even if a line roller is biased toward a stationary cover, the line roller is not brought into contact with a stationary shaft cover.

17 Claims, 8 Drawing Sheets

FISHING LINE GUIDE MECHANISM FOR A SPINNING REEL

This is a continuation of application Ser. No. 09/190,150, filed Nov. 12, 1998 now abandoned.

BACKGROUND OF THE INVENTION

1. Technical Field

The present invention relates to fishing line guide mechanisms for spinning reels. More particularly it relates to a spinning-reel fishing line guide mechanism, for guiding fishing line onto the reel spool, mounted on one of a pair of the bail support members pivotally supported endwise on the pair of rotor arms.

2. Description of Related Art

In a spinning reel, a rotor is configured to rotate about a spool. A fishing line guide mechanism for guiding a fishing line on to the spool is mounted at an end of one of a pair of bail support members. The bail support members and the fishing line guide mechanism are rotatable together with the rotor about the spool. The bail support members and the line guide mechanism are pivotal between a line-release position and a line-winding position. The fishing line guide mechanism is provided with a stationary shaft fixed at proximal end to one of the bail support members, a stationary shaft cover which is fixed to a distal end of the stationary shaft and on which one end of the bail is mounted, and a line roller rotatably supported on the stationary shaft between the stationary shaft cover and the bail support member. In the fishing line guide mechanism, the bail is swung to the line release position when the fishing line is to be released, and the fishing line is released from the forward end of the spool. Also, in winding the fishing line onto the spool, when the bail is swung into the fishing line winding position and the handle is rotated, the fishing line is guided and brought into contact with the outer circumferential surface of the line roller by the bail, and, changing the direction of the fishing line, is guided by the line roller and wound around the outer circumference of the spool.

In the spinning reel, the fishing line is released when the bail support members and the line guide mechanism are pivoted to the line release position. The fishing line is wound around the spool and an axis defined therein, the axis extending in a direction corresponding to the direction the fishing line travels when released from the spool. When the fishing line is released or cast out from the forward end of the spool, the fishing line spirals as it comes off the spool, generating twists in the fishing line. As the fishing line is wound back around the spool, it is drawn in along a path parallel to the axis of the spool and wound onto the circumferential periphery of the spool guided by the bail and the line roller. As a result, twists in the line occur, the twists being directionally reversed from the way the fishing line turns when released. For example, in a spinning reel in which the fishing line is to be wound clockwise as viewed from the forward end, when the fishing line is wound around the spool, counterclockwise twists in the line are generated upstream with respect to the winding direction. In general, in the spinning reel, in order to prevent twists in the fishing line fed off the spool, the fishing line is wound onto the spool in a twisted condition. In this case, if the same line twists were generated in opposite directions when feeding out line when winding on line, there would be no extra twist left in the fishing line wound around the spool.

However, in some cases while the line roller is guiding the fishing line, extra line twists are generated in the fishing line due to contact between the line roller and the fishing line. More specifically, when reeling in line under drag tension for example, the magnitude and/or direction of force applied to the fishing line changes due to contact resistance against the line roller. Consequently unanticipated torsion or bending force is applied to the fishing line, resulting in the generation of extra line twists, as mentioned above. As a result, the conventional fishing reel suffers from the problem that line twists are left in the fishing line wound around the spool, which makes it difficult to feed out the line smoothly, and even can make casting the fishing rig in a desired direction impossible.

Japanese Patent Application Laid-Open Nos. 08-23834 and 08-23836 disclose technical approaches to overcome the above-described line twisting problem. The spinning reels disclosed in the two above publications are provided with a fishing line guide mechanism in which a line roller is formed into a tapered shape gradually increasing its diameter in the line winding rotational direction of the rotor (on the front end side of the line roller) and a line guide portion is formed on the bail support member side of the line roller or on the bail support member. In this fishing line guide mechanism, the line roller is disposed so that the fishing line is at a bias toward the bail support member and the fishing line is guided to the spool while the fishing line is in contact with the line guide portion to thereby restrict the movement thereof in the axial direction. With such an arrangement, the movement of the fishing line in the axial direction is suppressed by the line roller and the line engagement between the line roller and the bail support member is prevented. Also, the line roller is formed into the tapered shape having its diameter gradually increased in the line winding rotational direction so that a frictional force difference is generated between the fishing line and the large diameter side and the small diameter side of the line roller and a reversed line twist from that of the line feeding mode is generated in the fishing line.

In the above-described conventional fishing line guide mechanism, since the fishing line is biased toward the bail support member and the fishing line is brought into contact with the line guide portion for guidance, the movement of the fishing line is suppressed and the fishing line engagement is moderated. However, when the fishing line is brought into contact with the line guide portion located on the bail support member side, the line twist in the same direction as that in the line feeding direction is generated, so that it is impossible to accurately generate the line twist that is reversed to that in the line feeding mode.

Also, since the line twist that is reversed to that in the line feeding mode is generated by utilizing the fact that the frictional force on the large diameter side is greater than that on the small diameter side in the circumferential surface of the line roller formed in the form of a tapered shape having the diameter gradually increased in the line winding rotational direction of the rotor (on the front end side of the line roller), it is difficult to accurately generate the line twist.

U.S. Pat. No. 5,769,344 to Kaneko et al. also addresses line-twisting problems in a spinning reel. The gist in every one of the forty-nine embodiments disclosed in this patent is to maintain fishing line being reeled onto the spinning reel spool in contact with a line guide associated with the line guide roller. In particular, the Kaneko et al. configuration is for keeping the fishing line in contact with the guide despite change in line position on the guide roller as the diameter of wound-on line increases.

In every one of the Kaneko et al. embodiments the fishing line is urged toward the bail arm in order to urge the line against the line guide in its many configurations. Accordingly, the rollers of the embodiments are all tapered toward the bail arm in its many corresponding configurations. This is true also of the roller proximate the bail arm in the dual-roller embodiments. One of the embodiments in the Kaneko et al. patent sets the line roller rotational axis obliquely with respect to the rotor axis, wherein the axial end of the line roller is bent generally backward toward the reel main body.

SUMMARY OF THE INVENTION

An object of the present invention is accurately to impart in fishing line passing over a line roller, when winding the line onto a spinning reel spool under drag tension, line twist that is the reverse of twist occurring in the line when feeding it out.

One aspect of the present invention is a fishing line guide mechanism for a spinning reel having a spool line-winding rotor from which a pair of diametrically opposed rotor arms extend axially. The line guide mechanism, for guiding a fishing line onto the spool, is mounted on either one of a pair of bail supports pivotably mounted endwise on the respective rotor arms for pivoting between line-winding and line-releasing positions. The line guide mechanism includes: a stationary shaft fixed endwise to the one bail support at a bias toward the line-releasing position of the bail supports with respect to the rotor rotational axis; a stationary shaft cover retained endwise on the stationary shaft opposite its fixed end at a spaced-apart interval from the one bail support; a line roller rotatably supported on the stationary shaft in the spaced-apart interval between the one bail support and the stationary shaft cover, the line roller having a reverse-twist generating configuration including a maximum-diameter flange (which in some configurations resembles a brim) adjacent the stationary shaft cover. The stationary shaft bias is defined as an acute angle between a line parallel to the line-roller rotational axis and the fishing line when substantially parallel to the rotor axis, in a plane containing the line both parallel to the line-roller rotational axis and intersecting that point where the fishing line when substantially parallel to the rotor axis last contacts the line roller. The stationary shaft bias and the reverse-twist generating configuration of the line roller constitute a reverse-twist generating means for imparting reverse-twist to fishing line being wound under tension onto the spool by bringing the fishing line against the maximum diameter flange.

In the fishing line guide mechanism, the fishing line is wound around the outer circumference of the spool while being guided onto the line roller by the rotation of the rotor and in doing so, the direction of movement of the fishing line changes. In this case, since the fishing line is displaced toward the line guide surface by the stationary shaft orientation, as the fishing line is wound around the spool, as the fishing line begins engagement with the line roller the fishing line engages one point on the line roller, but as the fishing line disengages the line roller on its way toward the spool, the fishing line leaves the line roller at a different axial position along the line roller. Consequently, the fishing line is brought into contact with the line guide surface of the line roller as it is guided by the line roller. The engagement with the line guide surface imparts a twist to the fishing line that is in the opposite direction of a twist imparted to the fishing line when the fishing line is released from the spool. Also, when the fishing line is brought into contact with the line guide surface, it is possible to accurately generate the line twist in a stable manner while always displacing the fishing line on the side of the first bail support member on the circumferential surface of the line roller.

The spool-ward portion of the line on the line roller is dragged along the radially extending surface of the flange portion when reeling in under tension, which imparts reverse twist.

In another aspect the pair of bail supports pertaining to the fishing line guide mechanism is pivotably mounted on the rotor arms, defining a bail pivotal axis through their pivotal centers. Therein the stationary shaft further is disposed at an acute angle with respect to a line tangential to a rotor-concentric circle and perpendicular to a plane containing the bail pivotal axis, urging the fishing line against the maximum diameter flange.

In another aspect of the invention, the reverse-twist generating configuration of the line roller further includes a bevel formed on the line roller flaring against and ending in a smaller diameter than the maximum diameter flange. The reverse-twist generating configuration brings the fishing line toward the maximum diameter flange when the reverse-twist generating means imparts reverse twist to fishing line being wound under tension onto the spool.

According to the above aspect of the invention, the fishing line is guided from the line roller as it is wound around the outer circumference of the spool. Since the line roller has an annular surface having a small diameter, the fishing line is drawn to the annular surface either before or after contacting the line guide surface. It is possible to generate the line twist in a stable manner while always displacing the fishing line on the side of the first bail support member on the circumferential surface of the line roller. In addition, since the line guide surface has a flange shape so that a diameter on the side of the stationary shaft cover is increased, as the fishing line is brought into contact with the line guide surface, the line twist in the same direction is generated. For this reason, it is possible to always make the direction of the generated line twist in the direction opposite to the direction when the fishing line is released.

The fishing line may be brought into contact with the line guide surface prior to contacting the annular surface as the fishing line is wound from a guide in a fishing rod around the spool in response to rotation of the rotor.

Alternatively, the fishing line contacts the line guide surface after coming into contact with the annular surface as the fishing line extends around the spool from the bottom line guide on the fishing rod in response to rotation of the rotor.

The bevel may be in axial dimension 1 to 40% the line roller in axial dimension. Further, the bevel may be in the range of 0.5 to 10 degrees.

The acute angle defining the stationary shaft bias may be less than 20°.

Another aspect of the present invention is a fishing line guide mechanism for a spinning reel having a spool line-winding rotor from which a pair of diametrically opposed rotor arms extend axially, the line guide mechanism being mounted on either one of a pair of bail supports pivotably mounted endwise on the respective rotor arms for pivoting between line-winding and line-releasing positions. The line guide mechanism herein includes: a stationary shaft fixed endwise to the one bail support at a bias toward the line-releasing position of the bail supports with respect to the rotor rotational axis; a stationary shaft cover retained endwise on the stationary shaft opposite its fixed end at a spaced-apart interval from the one bail support; a line roller rotatably supported on the stationary shaft in the spaced-apart interval between the one bail support and the stationary shaft cover. The line roller has a reverse-twist generating configuration including a first positioning surface adjacent the stationary shaft cover for initial contact with fishing line being wound under tension onto the spool, and a second positioning surface formed to displace slightly toward the one bail support fishing line extending from the line roller and being wound under tension onto the spool. Herein also, the stationary shaft bias is defined as an acute angle between a line parallel to the line-roller rotational axis and the fishing line when substantially parallel to the rotor axis, in a plane containing the line both parallel to the line-roller rotational axis and intersecting that point where the fishing line when substantially parallel to the rotor axis last contacts the line roller. Again, the stationary shaft bias and the reverse-twist generating configuration of the line roller constitute a reverse-twist generating means for imparting reverse twist to fishing line being wound under tension onto the spool by urging the fishing line toward the first positioning surface.

The spool-ward portion of the line on the line roller is displaced slightly toward the bail support by the bevel, thus to be dragged along the bevel as well as the radially extending surface of the flange portion when reeling in under tension, which imparts reverse twist.

In the fishing line guide mechanism, the fishing line is wound around the outer circumference of the spool while being guided from the line roller by the rotation of the rotor upon the winding operation of the fishing line. As it wraps around the line roller, the fishing line undergoes a change in direction. In this case, since the fishing line is displaced toward the line guide portion by the stationary shaft bias and the inclined surface, the fishing line is introduced onto the circumferential surface of the line roller while being urged to an end portion on the large diameter side of the slant surface of the line roller and is released away toward the spool while being disposed obliquely at the end portion on the small diameter side and positioned at the end on the small diameter side of the slant surface. Thus, the position where the fishing line is directed toward the spool is displaced from the stationary shaft cover side toward the bail support member side on the circumferential surface of the line roller so that a twist is imparted to the fishing line that is opposite the direction of twist imparted to the fishing line when it is being is released from the spool.

In the above fishing line guide mechanism, as the fishing line approaches the line roller it is biased into contact with the line roller at a first position. When the fishing line is released away from the line roller toward the spool, the fishing line is positioned at a different position on the line roller. Thus, the position where the fishing line is released toward the spool is displaced with respect to the stationary shaft cover side. The change in position of the fishing line as it engages the line roller compared to the position of the fishing line as it leaves the line roller makes it possible to predetermine the direction of a generated line twist in the fishing line as it is wound around the spool. It is therefore possible to generate the line twist in a reverse direction with high precision.

The first positioning surface may be a line-ward face of a maximum-diameter flange formed adjacent the stationary shaft cover.

The second positioning surface may configure an inflection point on the line roller as its smallest-diameter circumference.

The pair of bail supports pivotably mounted on the rotor arms therein defines a bail pivotal axis through their pivotal centers, and the stationary shaft further may be disposed at an acute angle with respect to a line tangential to a rotor-concentric circle and perpendicular to a plane containing the bail pivotal axis, urging the fishing line against the maximum diameter flange.

The line-ward face of the maximum-diameter flange may be slightly inclined toward the stationary shaft cover with respect to a plane perpendicular to the line-roller rotational axis, may be perpendicular to the stationary shaft, and, at its radially outermost point of fishing-line contact may be chamfered. Also, the inclination of the line-ward face of the maximum-diameter flange may run 1 to 15% of the line roller axially.

Further, the radial height between the inflection point and the line-ward face at its radially outermost point of fishing-line contact may be 1 to 15% the diameter of the maximum-diameter flange. And the line-ward face may be chamfered to round the radially outermost point of fishing-line contact at a radius of 0.1 to 0.5 mm. In addition, the first and second positioning surfaces may meet in a corner angular in cross-section.

In the present invention, the first-position surface and the maximum-diameter flange are located adjacent the stationary shaft cover, on the end of the stationary shaft opposite the bail-arm end. Accordingly, in the present invention, the fishing line is brought against the maximum-diameter flange (urged toward the first positioning surface), is opposite the bail arm, adjacent the stationary shaft cover. Thus one fundamental difference between the present invention and the devices disclosed in the Kaneko et al. reference is that the line roller configurations are oriented oppositely, and accordingly act oppositely on the fishing line.

Accordingly the present invention is a spinning-reel line roller mechanism configured and disposed for imparting reverse twist in the fishing line when it is being reeled in under drag tension, as when a fish has been caught. When thus reeling in under drag tension, extra line twists are generated in the fishing line. Contact resistance with the line roller when reeling in under drag tension changes the magnitude and direction of force on the fishing line, leading to unanticipated movement or bending force on the line, as noted earlier.

The present invention orients the stationary shaft at a bias (obliquely) with respect to the rotor rotational axis, but toward the line-releasing position of the bail supports, opposite orientation disclosed in U.S. Pat. No. 5,769,344 to Kaneko et al.

DETAILED DESCRIPTION OF THE PREFERRED EMBODIMENT

A first embodiment of the present invention is described below.

Figure 1:
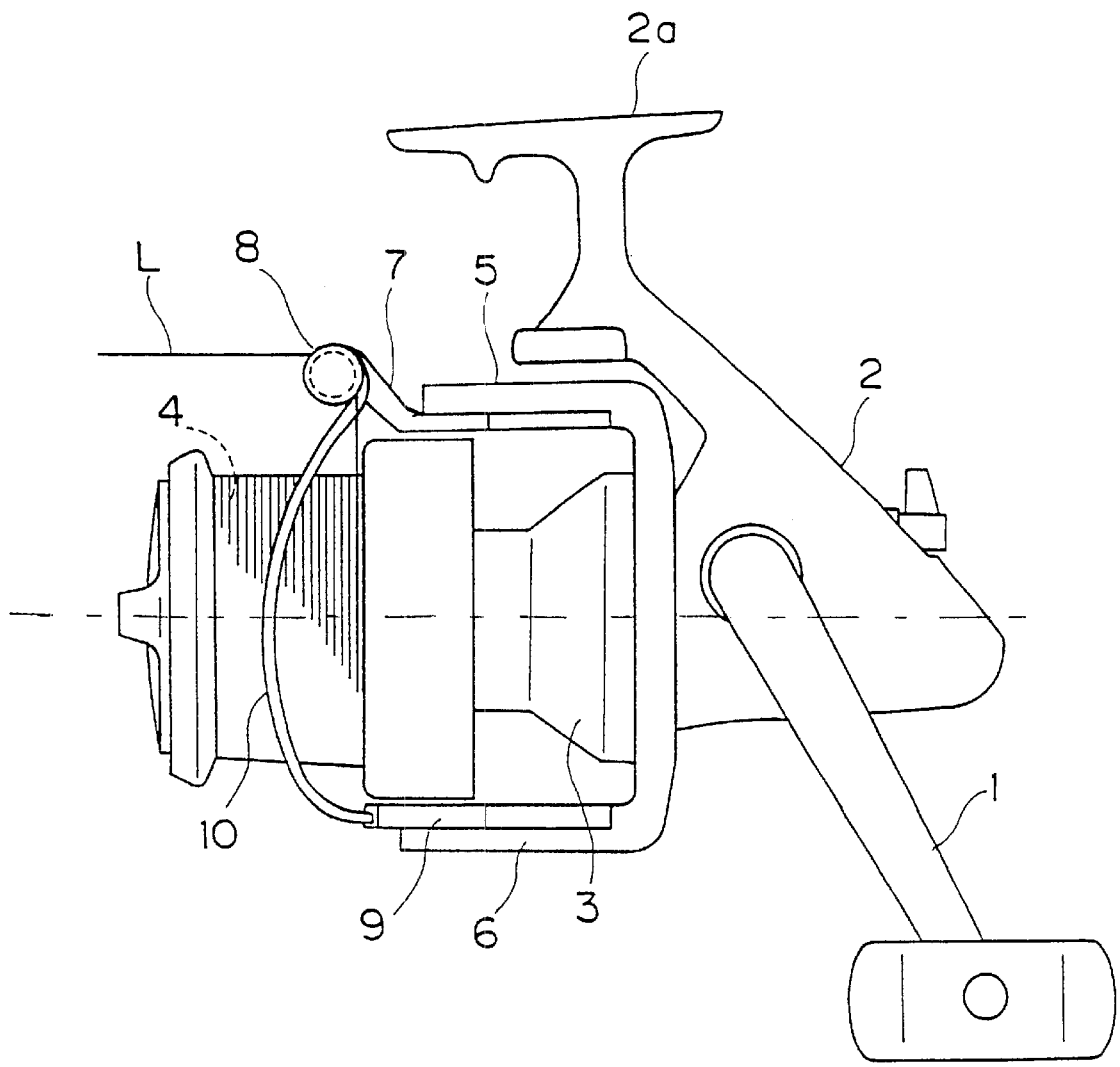
FIG. 1 is a side elevation view showing a spinning reel according with a first embodiment of the present invention.
Figure 2:
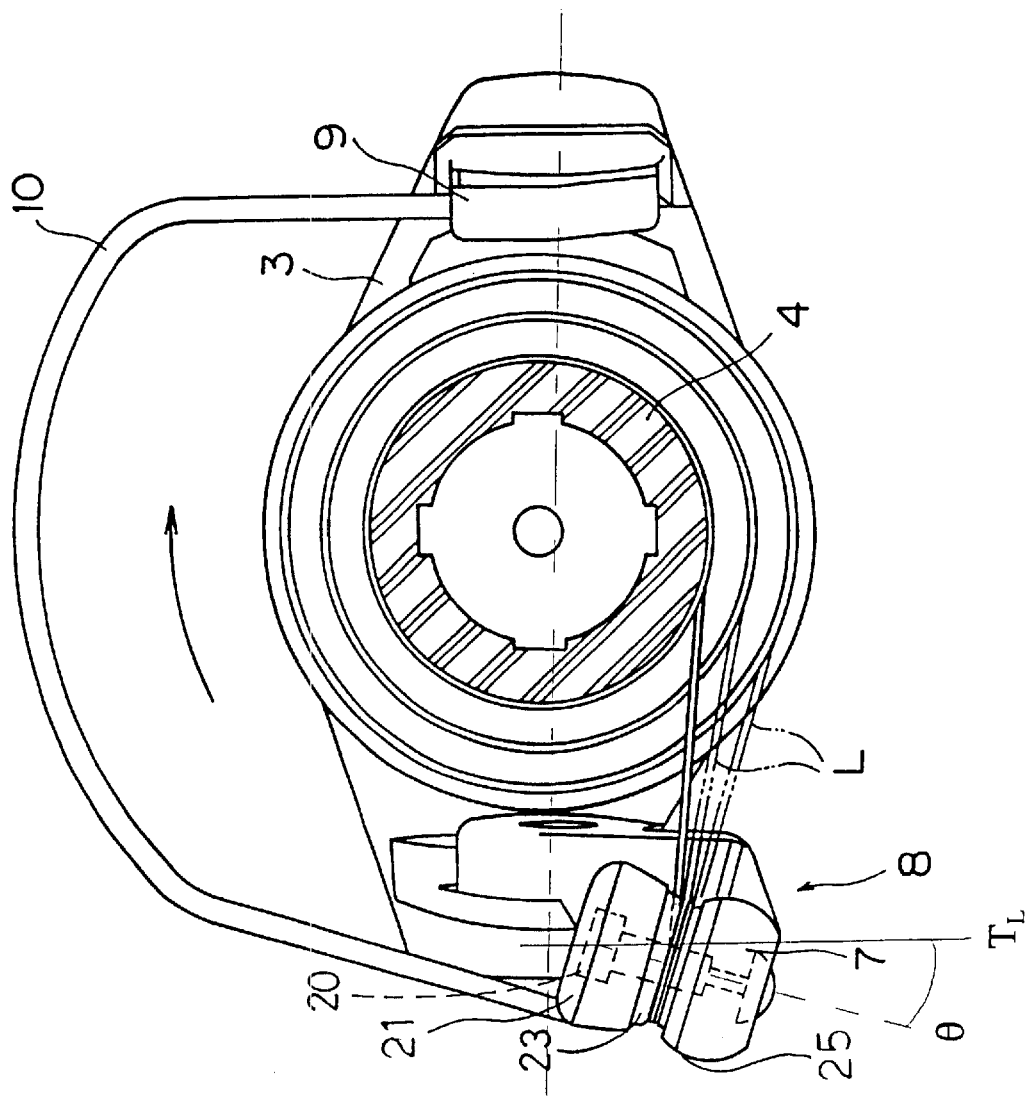
FIG. 2 is a part cross-section, part elevation front view showing the spinning reel depicted in FIG. 1.

A spinning reel in accordance with a first embodiment of the present invention shown in FIGS. 1 and 2 is provided with a reel body 2 having a handle 1, a rotor 3 rotatably supported on the front portion of the reel body 2, and a spool 4 which is disposed on the front portion of the rotor 3 and around which a fishing line L is wound in response to rotation of the rotor. The rotor 3 and the spool 4 define a central axis about which the rotor 3 rotates.

A mounting portion 2a is formed on the upper portion of the reel body 3 for mounting the spinning reel onto a fishing rod. The spinning reel also includes within the reel body 2, a rotor drive mechanism (not shown) for rotating the rotor 3 and an oscillating mechanism (not shown) for moving the spool 4 back and forth along the central axis thereof in response to rotation of the handle 1. The oscillating movement of the spool 4 along with the rotation of the rotor 3 provide a means for uniformly and evenly winding the fishing line L around the spool 4. It should be noted, that as the fishing line L is wound around the spool 4 by the rotor 3, the fishing line L follows a spiraling path.

The rotor 3 has a first arm portion 5 and a second arm portion 6 extending forward generally parallel to the central axis. The two arm portions 5 and 6 extend from opposite circumferential sides of the rotor facing to each other. A first bail support member 7 is pivotally mounted on an inner surface of a front end of the first arm portion 5. A fishing line guide mechanism 8 for guiding the fishing line onto the spool 4 is mounted at the front end of the first bail support member 7. A second bail support member 9 is pivotally mounted on an inner surface of a front end of the second arm portion 6. A bail 10 is provided between the fishing line guide mechanism 8 and the second bail support member 9.

Figure 3:
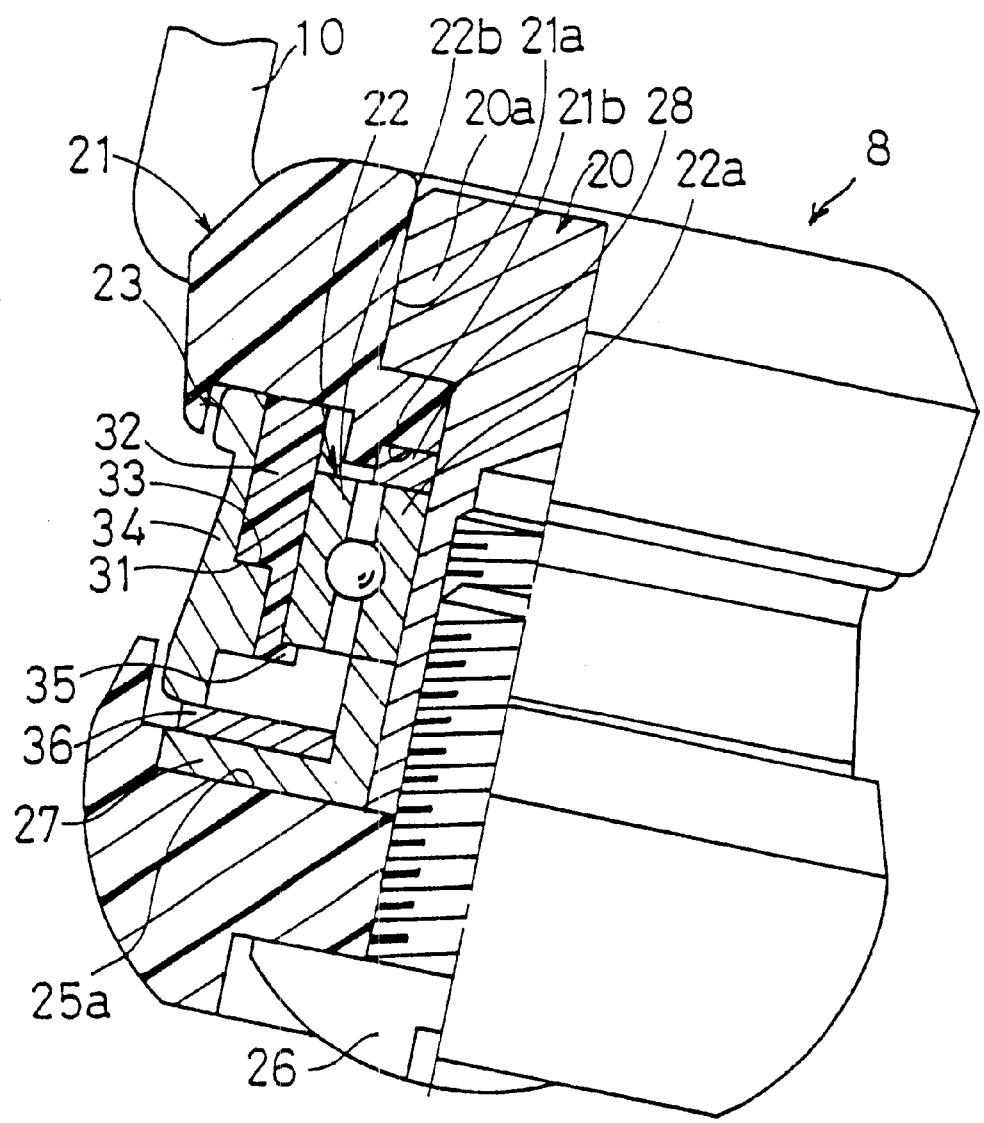
FIG. 3 is a fragmentary, part cross-section, part elevation front view showing a fishing line guide mechanism of the spinning reel depicted in FIGS. 1 and 2, only in an enlarged scale.

The structure of fishing line guide mechanism 8 is described below with respect to FIGS. 2, 3, 4 and 5. The fishing line guide mechanism 8 includes a stationary shaft 20 that is fixed at one end to the first bail support member 7. A stationary shaft cover 21 is formed to receive and support one end of the stationary shaft 20, as shown in FIG. 3. A roller bearing 22 is fitted on the stationary shaft 20, and a cylindrically shaped line roller 23 is fitted onto the roller bearing 22, as is described in greater detail below.

The stationary shaft 20 is formed with a flange portion 20a having a large diameter. The flange portion 20a is retained in a retainer hole 21a formed in the stationary shaft cover 21. A distal end of the stationary shaft 20 is fixed by a stationary screw 26 to a fishing line guide member 25 formed at a tip end of the first bail support member 7.

Figure 4:
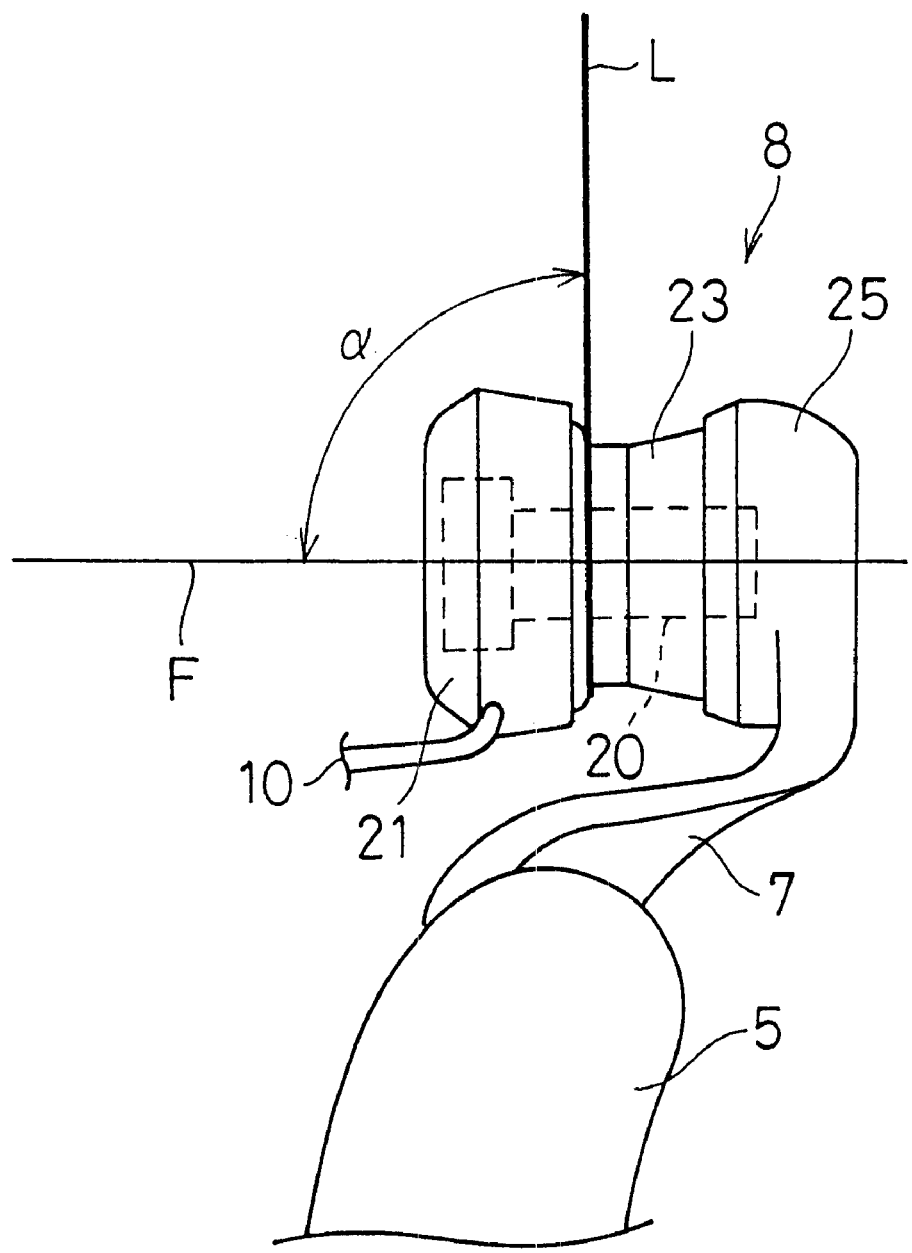
FIG. 4 is a fragmentary side elevation view showing features of the fishing line guide mechanism depicted in FIGS. 2, 3 and 4.

As shown in FIG. 4, during use of the spinning reel, the fishing line L extends from the line roller 23 to a guide snot shown) of a fishing rod (not shown). A rotation axis (not shown in FIG. 4) is defined by the line roller 23 and the stationary shaft 20. A line F is defined in a direction that is generally parallel to the not-depicted rotation axis of the line roller 23, such that the line F intersects the point where the fishing line L first engages the line roller 23. The stationary shaft 20 is fixed to the fishing line guide member 25 such that, in a plane defined by the fishing line L and the straight line F, an angle $\alpha$ is defined between the fishing line L and the straight line F and is an acute angle ($\alpha<90°$). Therefore, the line F is not quite perpendicular to a rotational axis of the rotor 3. Or, in other words, the rotational axis of the stationary shaft 20 is not perpendicular to the rotational axis of the rotor 3, but may be close to being so if the angle a is set close to 90°. Also, as shown in FIG. 2, the distal end of the stationary shaft 20 is fixed to the fishing line guide member 25 so that the tip end thereof extends more toward the spool 4 than the distal end does. Fixing the stationary shaft 20 thus oriented brings the fishing line L extending over the line roller 23 toward the stationary shaft cover 21 when tension acts on the fishing line L during the line reeling-in operation. In other words, the fishing line L extends around the line roller 23 defining a plane that is not perpendicular to the rotational axis of the line roller 23.

As is shown in FIG. 4, the fishing line guide member 25 is formed integrally with the tip end of the first bail support member 7 and has a spherical shape.

The stationary shaft cover 21 and the fishing line guide member 25 have similar shapes. The retainer hole 21a retains the flange portion 20a of the stationary shaft 20 and is formed at the center of the stationary shaft cover 21. The stationary shaft cover 21 is held in place by the stationary shaft 20 and other members (described below) such that the stationary shaft cover 21 and the fishing line guide member 25 are spaced apart from one another.

The roller bearing 22 is fitted on the stationary shaft 21 between the fishing line guide member 25 and the stationary shaft cover 21 for rotatably supporting the line roller 23. A bearing support member 27 is formed with a cylindrical portion and a flange where the flange is retained in a recess 25a formed in a portion of the fishing line guide member 25 and the cylindrical portion of the bearing support member 27 engages an inner race 22a of the roller bearing 22. A spacer 28 is fitted into a recess 21b of the stationary shaft cover 21. The spacer 28 is in contact with an recess 21b of the stationary shaft cover 21. With such an arrangement, the inner race 22a is retained in position in the axial direction by the spacer 28 and the bearing support member 27.

The line roller 23 is fitted onto the roller bearing 22 such that in may not move in the axial direction, along the rotational axis of the line roller 23. The line roller 23 is fitted onto an outer race 22b of the roller bearing 22 in the direction of the stationary cover 21. The line roller 23 includes a first sleeve member 32 made of resin material and has on an outer circumferential surface thereof a stepped portion 31 with a larger diameter on the stationary shaft 20 side thereof. The line roller 23 also includes a second sleeve member 34 that is fitted on the outer circumferential surface of the first sleeve member 32. The second sleeve member 34 is made of brass and has on its inner circumferential surface a stepped portion 33 engaged with the stepped portion 31. The first sleeve member 32 is provided at its inner circumferential surface with a retainer portion 35 which extends radially inward for engagement with end face of the outer race 22b of the roller bearing 22 on the side of the fishing line guide member 25. With such an arrangement, the line roller 23 is not movable in a direction toward the stationary shaft cover 21. As a result of the above configuration of the line roller 23, a clearance (not shown) is continually defined between the line roller 23 and the stationary shaft cover 21.

Figure 5:
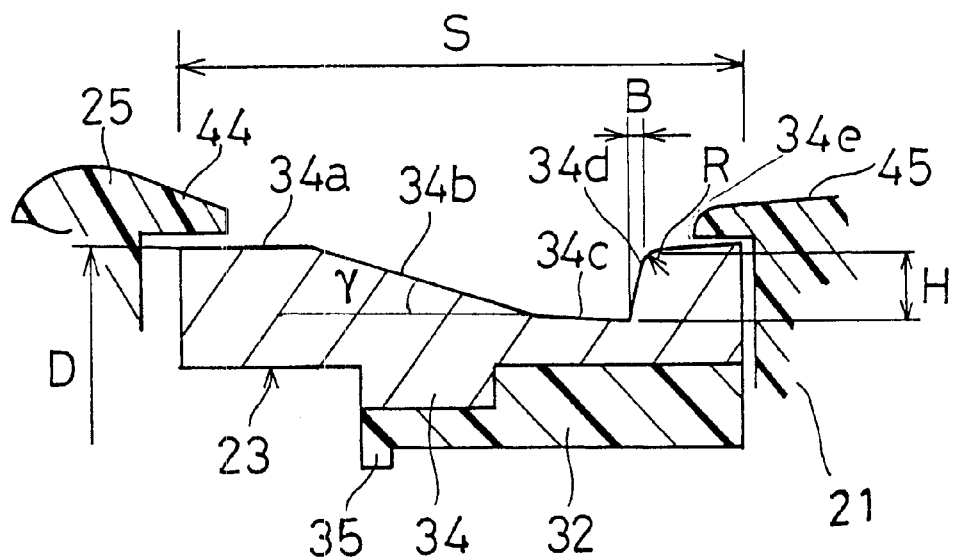
FIG. 5 is a fragmentary cross-section view showing a line roller portion of the line guide mechanism depicted in FIGS. 2–4, on an enlarged scale.

The various surfaces of the second sleeve member 34 of the line roller 23 are described below with specific reference to FIG. 5. The second sleeve member 34 includes a parallel surface 34a, a tapered surface 34b, a first slant surface 34c, a line guide surface 34d and a second slant surface 34e, all formed in the listed order going from left to right in FIG. 5, from the fishing line guide member 25 side to the stationary shaft cover 21 side. The parallel surface 34a is generally parallel with the rotational axis (not shown) defined by the line roller 23 and the stationary shaft 20.

The parallel surface 34a and the portion of the second slant surface 34e having a maximum diameter (the right end in FIG. 5) have substantially the same outer diameter. Further, the outer diameter of the first slant surface 34c is smaller than either of the outer diameter of the parallel surface 34a and the second slant surface 34e. The tapered surface 34b has a conical shape that is formed so as to smoothly connect the parallel surface 34a and the first slant surface 34c to each other. Preferably, the taper of the tapered surface 34b with respect to the rotational axis (not shown) of the line roller 23 is an angle γ in the range of, for example, 5 to 10 degrees. The first slant surface 34c is slanted so that its diameter decreases going toward the right side of FIG. 5. However, it should be understood that the angle γ of the tapered surface 34b could be anywhere in a range of 0 to 15 degrees. The second slant surface 34e is slanted so that its diameter is increases going toward the right side of FIG. 5. It is preferable that its slant angle of the second slant surface 34e is in the range of 0 to 5 degrees with respect to a plane perpendicular to the rotational axis of the line roller 23.

The line guide surface 34d of the second sleeve member 34 is formed into a flange shape, or brim, that is somewhat slanted toward the side of the stationary shaft cover 21. The fishing line L displaced on the side of the stationary shaft cover 21 in the line winding mode is brought into contact with the line guide surface 34d. A height H of the line guide surface 34d is, for example, 1.3 mm. The portion of the line roller 23 having a diameter D for example, 11.9 mm. It is preferable that the height H is in the range of 1 to 15% of the maximum outer diameter D. If the height H of the line guide surface 34d is set in such a range, the frictional force between the line guide surface 34d and the fishing line L is small. Even if the fishing line L is brought into contact with the line guide surface 34d, excessive friction will not likely be generated.

In one configuration of the first embodiment, an axial length B of the line guide surface 34d is, for example, 0.6 mm, and an entire length S of the line roller 23 is, for example, 5 mm. It is preferable that the axial length B is in the range of 1 to 15% of the entire length S. The axial length B is important because of interaction between the line guide surface 34d and the fishing line L. For instance, as the fishing line L is wound around the spool 4, the fishing line L comes from the last guide (not shown) in the fishing rod (not shown) and extends to the line roller 23. Looking at FIG. 2, it should be understood that the fishing line L comes from above the plane defined by the depiction in FIG. 2. Further, with respect to FIG. 2, the guide (not shown) of the fishing rod (not shown) is typically located proximate a point on a line that extends out from the center of the spool 4 and rotor 3. Therefore, as the fishing line L is drawn from the guide (not shown) the line L first typically engages the line roller 23 at the surface 34c or at a radially outer portion of the line guide surface 34d and engages at least a portion the radial width of the line guide surface 34d. Further, as is indicated in FIGS. 2 and 4, as the fishing line L leaves the line roller 23 and is wound around the spool 4, the fishing line L again further engages the line guide surface 34d. Engagement between the line guide surface 34d and the fishing line L imparts a line twist in a reverse direction to the fishing line L as it is wound around the spool 4. As should be clear from the above and from FIGS. 2, 3 and 5, the axial length B of the line guide surface 34d is further important for determining the contact position and the release position of the fishing line L relative to the line guide surface 34d.

A border portion between the line guide surface 34d and the second slant surface 34e, i.e., the outer side end portion of the line guide surface 34d is rounded or beveled in an arcuate shape in cross section. It is preferable that a radius R of the arcuate portion is in the range of 0.1 to 0.5 mm. If the outer circumferential end portion is thus rounded or beveled, the fishing line L is likely to slide smoothly relative to the line guide surface 34d when the fishing line L contacts the outer circumferential side thereof. As a result, undesirable twists in the line hardly occur in this portion of the line roller 23.

Also, a border portion between the line guide surface 34d and the first slant surface 34c, i.e., the inner circumferential end portion is formed in an angular shape in cross section. If the inner circumferential end portion is not rounded or beveled but formed into the angular shape, the fishing line is likely to follow the inner circumferential end portion of the line guide surface 34d. As a result, the line twist caused by the contact with the first slant surface 34c will be accurately produced. A thrust bearing ring 36 made of Durcon™ (resin) is interposed between the end face, on the line guide member 25 side, of the line roller 23 and the flange portion of the bearing support member 27. The thrust bearing ring 36 is used to prevent the direct contact between the line roller 23 and the fishing line guide member 25.

It should be understood that as the fishing line L extends from the guide (not shown) of the fishing rod (not shown) toward the line roller 23 and enters into engagement with the line roller 23, the orientation of the line roller with respect to the spool 4 (and hence with respect to the guide) biases the fishing line toward the line guide surface 34d. Specifically, the first bail support member 7 and the second bail support member 9 pivot about an axis as indicated in FIG. 2 that extends through the rotor 3. A tangential line $T_L$ is perpendicular to the axis defined by the pivoting movement of the first bail support member 7 and the second bail support member 9. The tangential line $T_L$ is also tangent to a circle (not shown) whose center is the center of the rotor 3 at a point which falls on the axis defined by the pivoting movement of the first bail support member 7 and the second bail support member 9. As can be seen in FIG. 2, the stationary shaft 20 is not parallel to tangential line $T_L$ but rather is offset from the tangential line $T_L$ by an angle θ. The angle θ is preferably less that 25° greater than 2°. The offset orientation of the stationary shaft 20 creates a biasing effect on the fishing line L urging it into contact with the line guide surface 34d.

Fishing Line Guide Operation

When the rotor 3 is rotated by the handle 1, the fishing line L is wound around the spool 4 while being guided by the bail 10 and the line roller 23. In this case, the fishing line L is guided from the line guide surface 34d of the line roller 23 to the spool 4. Incidentally, since the line roller 23 is rotated smoothly by the action of the roller bearing 22 in accordance with the passage of the fishing line L, a large resistance is not applied to the fishing line L and the fishing line may pass smoothly. As shown in FIG. 2, even if the amount of the fishing line L wound around the spool 4 is changed to thereby change its outer circumferential diameter, the fishing line L is guided always from a constant point to the spool 4 by the line guide surface 34d. As a result, the amount of the twist generated in the fishing line L becomes stable. There is almost no fear that the extra twist, due to the difference between the line twist in the feeding mode and the line twist in the winding mode of the fishing line L, is left in the fishing line L.

In the above-described operation, the fishing line L is guided along the tapered circumference 44 of the fishing line guide member 25 and the tapered circumference 45 of the stationary shaft cover 21 from the bail 10 and fed to the circumference of the line roller 23. Then, the fishing line L is brought against the line guide surface 34d by the force applied to the fishing line L and the line roller 23 is biased toward the stationary shaft cover 21 by its reactive force. (Note that as mentioned previously there is a clearance between the line roller 23 and the stationary shaft cover 21.) However, the inner circumferential surface of the first sleeve member 32 of the line roller 23 is not movable in a direction toward the stationary shaft cover 21 by the retainer portion 35, and the first sleeve member 32 and the second sleeve member 34 are not movable in the direction toward the stationary shaft cover 21 in the same manner by the stepped portions 31 and 33. Accordingly, even if the line roller 23 is biased toward the stationary shaft cover 21, it hardly contacts with the stationary shaft cover 21.

Also, since the fishing line L is displaced toward the stationary shaft cover 21, the fishing line L is released toward the spool 4 on the side of the first bail support member 7 from the position where the fishing line L is in contact with the circumferential surface of the line roller 23. Then, when the fishing line L is brought into contact with the line roller 23, the fishing line is in contact with the flanged guide surface 34d. Accordingly, the fishing line L in its position oriented toward the spool 4 is displaced slightly toward the first bail support member 7, which generates line twist directed reverse to when the line is reeled out. Again, with the fishing line L contacting the line guide surface 34d, the line guide surface 34d rotating by rotation of the line roller 23 brings about line twist directed reverse to when casting, in line thereby brought into contact with the line guide surface 34d. However, since the angular portion is formed in the inner circumferential end portion of the line guide surface 34d, the fishing line L is liable to follow the inner circumferential end portion so that the precision of the line twist at the first slant surface 34c may be enhanced.

Herein, bringing the fishing line L against the stationary cover 21 generates stable line twist because fishing line L guided by the line roller 23 is always displaced slightly on the line roller 23 circumferential surface from the stationary cover 21 toward the first bail support member 7. Further, the line guide surface 34d is formed as a flanged portion, or brim, the roller 23 is of larger diameter toward the stationary shaft cover 21. Therefore, wherein the fishing line L is brought into contact against the line guide surface 34d, line twist in the same direction is generated. For this reason, the direction of the line twist generated is always opposite twist in the line when feeding out, enhancing precision in generation opposite line twist.

Second Embodiment

Figure 6:
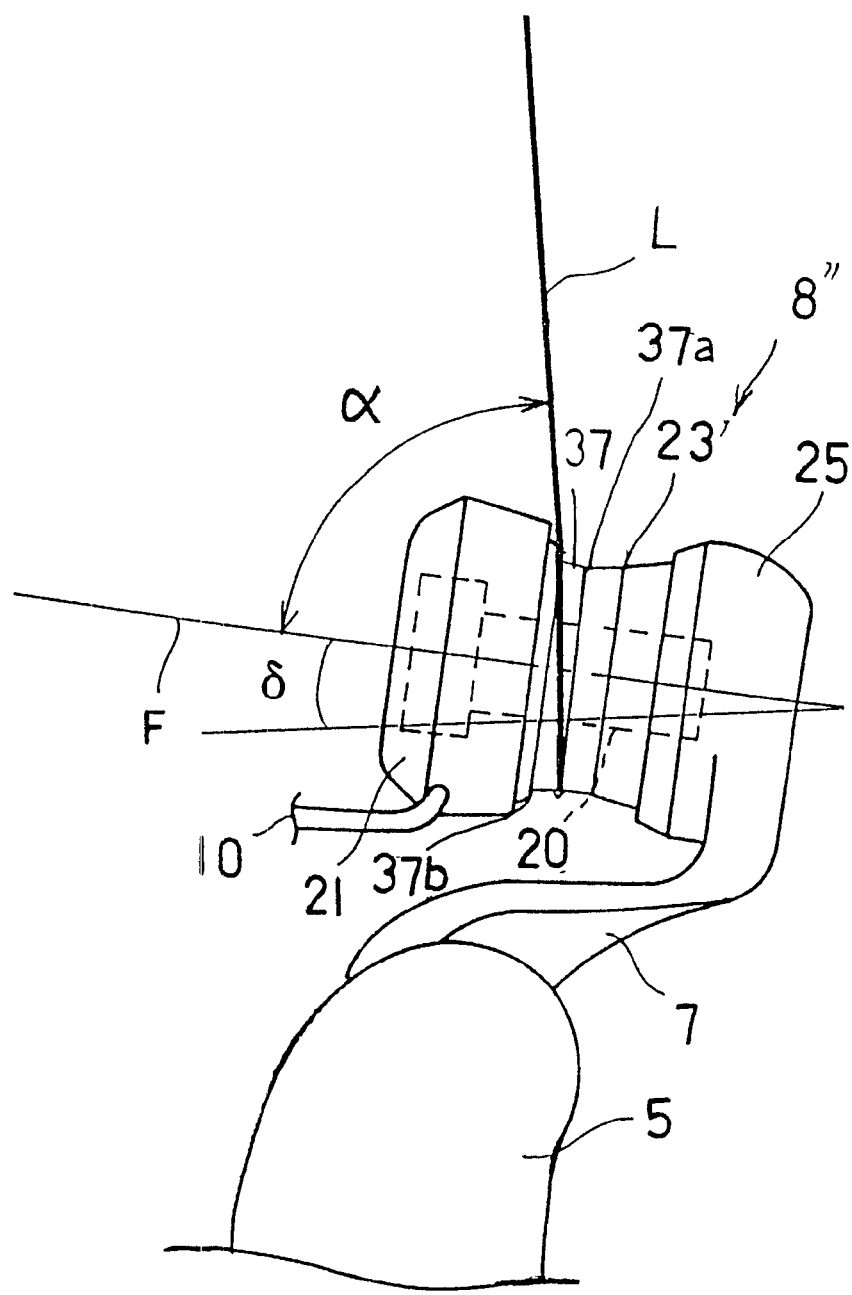
FIG. 6 is a view similar to FIG. 4, showing a second embodiment of the present invention.
Figure 7:
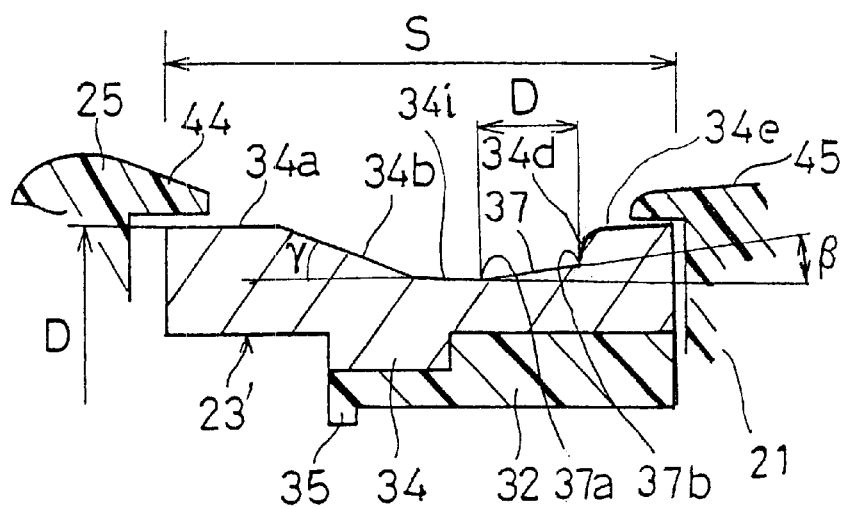
FIG. 7 is a view similar to FIG. 5, showing details of the line roller portion in accordance with the second embodiment depicted in FIG. 6.

As shown in FIGS. 6 and 7, there is a second embodiment of a line roller 23' of a line guide mechanism 8" which includes many of the features of the line roller 23 of the first embodiment. For instance, the line roller 23' includes: a parallel surface 34a, a tapered surface 34b, a line guide surface 34d and a second slant surface 34e. However, the line roller 23' also includes an arcuate surface 34i and a first slant surface 37. The various surfaces of the line roller 23' are formed in the following order beginning at the left side of FIG. 7: the parallel surface 34a, the tapered surface 34b, the arcuate surface 34i, the first slant surface 37, the line guide surface 34d and the second slant surface 34e.

The parallel surface 34a and the maximum diameter portion (at the right end in FIG. 7) of the second slant surface 34e have generally the same outer diameter. The outer diameter of the arcuate surface 34i is smaller than the outer diameter of the parallel surface 34a and the second slant surface 34e. The tapered surface 34b is formed so as to smoothly connect the parallel surface 34a and the arcuate surface 34i to each other. It is preferable that a taper angle γ of the tapered surface 34b is in the range of, for example, 5 to 10 degrees. The arcuate surface 34i is formed so that its contour defines an arc having a radius of, for example, 100 to 500 mm wherein the center point of the radius is radially outward of the first slant surface 37.

The first slant surface 37 is slanted so that its diameter increases going toward the right side of FIG. 7. It is preferable that slant angle β of the first slant surface 37 be in the range of 0.5 to 10 degrees. It is preferable that the length of the first slant surface 37 is in the range of 1 to 40% of the entire length S. As shown in FIG. 6, the first slant surface 37 is formed for the purpose of guiding the fishing line L into contact with the line roller 23' at the end portion 37a of the first slant surface 37 as the fishing line L approaches the mechanism 8' from a guide (not shown) of a fishing rod (not shown). In other words, as the fishing line L approaches the line guide mechanism 8", it first contacts the line roller 32' on the first slant surface 37 at the end portion 37b. The fishing line L then wraps part way around the line roller 23', as shown in FIG. 6, until it engages the end portion 37a of the first slant surface 37, which is the small diameter side of the first slant surface 37. The fishing line L then extends toward the spool 4 from the end portion 37a on the small diameter side of the first slant surface 37. Therefore, as the fishing line L is wound around the spool 4, the fishing line L follows a path that is slanted and displaced toward the first bail support member 7 on the first slant surface 37. Thus, the fishing line L is slanted and displaced toward the first bail support member 7 at a predetermined interval on the first slant surface 37 so that the twist in the opposite direction to the twist in a line releasing mode may be generated in the fishing line L in contact with the rotating line roller 23' with high precision.

The line guide surface 34d is formed in the same manner as in the first embodiment. The fishing line L displaced toward the stationary shaft cover 21 in the line winding mode is brought into contact with the line guide surface 34d. The height and the length in the width direction of the line guide surface 34d and the maximum diameter of the line roller 23' are the same as those of the first embodiment.

The small diameter end portion 37a and the large diameter end portion 37b of the first slant surface 37 are formed in angular shapes in cross section, respectively. If the end portions 37a and 37b are not rounded but thus angularly beveled, as shown in FIG. 6, the fishing line L in contact with the line roller 23' is hardly displaced in the axial direction at the end portion 37b. The fishing line L is positioned with high precision, and at the same time, the fishing line released away from the line roller 23' toward the spool 4 is hardly displaced in the axial direction at the end portion 37a. Thus, the fishing line may be positioned with high precision. For this reason, the phase of the fishing line wound along the first slant surface 37 is determined at a predetermined value and the line twist in the opposite direction is generated in the fishing line slanted and located on the second slant surface 37 may be generated with higher precision.

It should be appreciated that the line F in FIG. 6 defines generally the same angle α as was discussed above with respect to the first embodiment, however, the angle α in FIG. 6 may be slightly smaller than in the first embodiment. The line F is generally parallel to the rotational axis of the line roller 23 and further corresponds to the center of the stationary shaft 20. Further, the line F in FIG. 6 is not perpendicular to the rotational axis of the rotor 3, but rather the line F in FIG. 6 is clearly angularly offset from a plane that is perpendicular to the rotational axis of the rotor 3. An angle α is defined between this plane and the line F. Therefore, the rotational axis of the line roller 23 is offset from the plane defined perpendicular to the rotational axis of the rotor 3 and is also offset from line $T_L$ as was described above with respect to the first embodiment in FIG. 2.

In such a line guide mechanism 8', in the fishing line winding mode, the fishing line is guided to the line roller 23' by the rotation of the rotor 3 with its direction being changed and is wound around the outer circumference of the spool 4. At this time, since the fishing line is displaced toward the line guide surface 34d and the first slant surface 37 is provided, the fishing line is positioned and brought into contact with the circumference surface by the end portion 37b on the large diameter side of the first slant surface 37, slanted and disposed to the end portion 37a on the small diameter and is positioned at the end portion 37a of the small diameter side and released toward the spool 4. Thus, the position where the fishing line is released toward the spool 4 is displaced obliquely on the side of the first bail support member 7 on the circumferential surface of the line roller 23' so that the line twist opposite the line twist in the line feeding mode may be generated.

In this case, since as the fishing line L is wound in and first engages the line roller 23' proximate the line guide surface 34d having a relatively large diameter proximate the stationary shaft cover 21 and the position where the fishing line is in contact with the line roller 23' and the position where the fishing line is released away from the line roller 23' are biased into place by the taper of first slant surface 37, it is possible to generate the stable line twist by always displacing the fishing line toward the first bail support member 7 on the circumferential surfaces of the line roller 23'. For this reason, the direction of the generated line twist may be always opposite to the line twist in the line feeding mode, and the precision of the generation of the opposite line twist may be enhanced.

Figure 8:
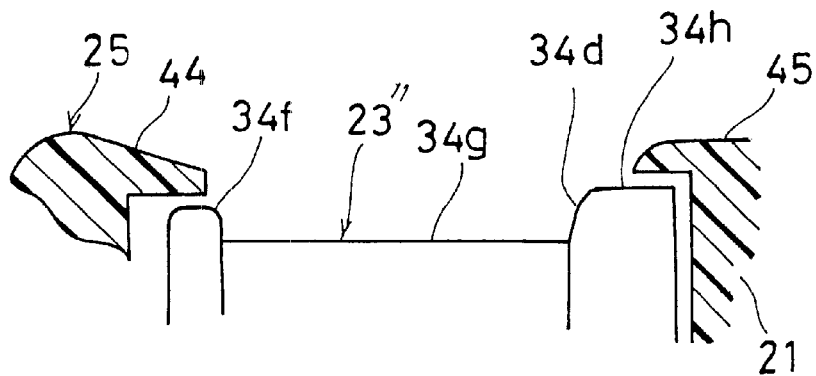
FIG. 8 is a view similar to FIGS. 5 and 7, showing third embodiment of the present invention, the third embodiment being a modification of the first embodiment depicted in FIG. 5.

Other Modifications and Embodiments (a) In the first embodiment, the parallel surface 34a, the tapered surface 34b, the first slant surface 34c, the line guide surface 34d and the second slant surface 34e are formed continuously on the circumferential surface of the line roller 23. However, the line guide surface 34d may be employed with various other surfaces of the line roller 23 being given other arrangements. For example, in a third embodiment FIG. 8, a first parallel surface 34f, a second parallel surface 34g having a small diameter, a line guide surface 34d and a third parallel surface 34h having a large diameter are formed continuously. In this case, the first and third parallel surfaces 34f and 34h having the large diameters have substantially the same diameter. The respective shapes of the line guide surface 34d are the same as those of the first embodiment. With such an arrangement, it is also possible to ensure the same effect as that of the first embodiment.

Figure 9:
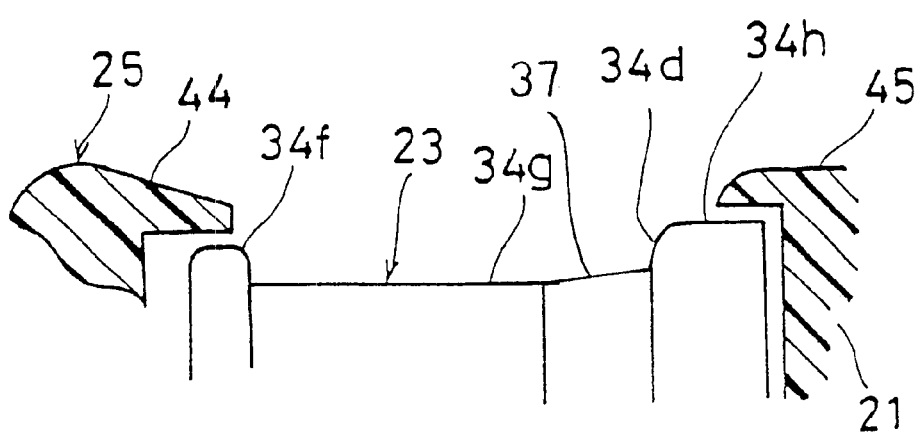
FIG. 9 is a view similar to FIGS. 5, 7 and 8, showing a fourth embodiment, the fourth embodiment being a modification of the second embodiment depicted in FIG. 7.

(b) In the second embodiment described above, the parallel surface 34a, the tapered surface 34b, the arcuate surface 34i, the first slant surface 37, the line guide surface 34d and the second slant surface 34e are formed continuously on the circumferential surface of the line roller 23. However, the first slant surface 37 and the line guide surface 34d may be provided other portions of the line roller 23' being given other arrangement. For example, in FIG. 9, a fourth embodiment is shown with a first parallel surface 34f, a second parallel surface 34g having a small diameter, a slant surface 37, a line guide surface 34d and a third parallel surface 34h having a large diameter are formed continuously. In this case, the first and third parallel surfaces 34f and 34h having the large diameters have substantially the same diameter. The respective shapes of the slant surface 37 and the line guide surface 34d are the same as those of the second embodiment. With such an arrangement, it is also possible to ensure the same effect as that of the second embodiment.

(c) In the first and second embodiments 1 and 2, the line guide surface 34d is slanted. However, the line guide surface may be a wall surface vertical to the axis of the line roller 23.

(d) In the foregoing embodiments, the inner circumferential end portion of the line guide surface 34d is formed into an angular shape so that the line twist is mainly generated at the border portion between the line guide surface 34d and the first slant surface 34c. However, it is possible to generate the line twist mainly at the first slant surface 34c by rounding this portion.

In each embodiment of the present invention, the fishing line guide mechanisms for a spinning reel are each configured to direct the fishing line toward a portion of the line roller having a large diameter on the side of the stationary shaft cover, specifically the line guide surface 34d, it is possible to generate the stable line twist by always displacing the fishing line toward the bail support member on the circumferential surface of the line roller. In addition, since the line guide surface 34d is formed into a flanged shape having an increasing diameter going toward the stationary shaft cover, even if the fishing line is brought into contact with the line guide surface, the line twist in the same direction is generated. For this reason, the direction of the generated line twist may be always opposite to the line twist in the line feeding mode, and the precision of the generation of the opposite line twist may be enhanced.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. For a spinning reel having a spool line-winding rotor from which a pair of diametrically opposed rotor arms extend axially, a fishing line guide mechanism mounted on either one of a pair of bail supports pivotably mounted endwise on the respective rotor arms for pivoting between line-winding and line-releasing positions, the fishing line guide mechanism for guiding a fishing line onto the spool and comprising:

a stationary shaft fixed endwise to the one bail support at a bias toward the line-releasing position of the bail supports with respect to the rotor rotational axis;

a stationary shaft cover retained endwise on said stationary shaft opposite its fixed end at a spaced-apart interval from the one bail support; and a line roller rotatably supported on said stationary shaft in the spaced-apart interval between the one bail support and said stationary shaft cover, said line roller having a reverse-twist generating configuration including a maximum-diameter flange adjacent said stationary shaft cover; wherein said stationary shaft bias is defined as an acute angle between a line parallel to the line-roller rotational axis and the fishing line when substantially parallel to the rotor axis, in a plane containing the line both parallel to the line-roller rotational axis and intersecting that point where the fishing line when substantially parallel to the rotor axis last contacts the line roller, and said stationary shaft bias and the reverse-twist generating configuration of said line roller constitute a reverse-twist generating means for imparting reverse twist to fishing line being wound under tension onto the spool by bringing the fishing line against said maximum diameter flange.

2. The fishing line guide mechanism according to claim 1, the pair of bail supports pivotably mounted on the rotor arms therein defining a bail pivotal axis through their pivotal centers, wherein said stationary shaft further is disposed at an acute angle with respect to a line tangential to a rotor-concentric circle and perpendicular to a plane containing the bail pivotal axis, urging the fishing line against said maximum diameter flange.

3. The fishing line guide mechanism according to claim 1, wherein said reverse-twist generating configuration of said line roller further includes a bevel formed on said line roller flaring against and ending in a smaller diameter than said maximum diameter flange, wherein said reverse-twist generating configuration brings the fishing line toward said maximum diameter flange when said reverse-twist generating means imparts reverse twist to fishing line being wound under tension onto the spool.

4. The fishing line guide mechanism according to claim 3, wherein said bevel is in axial dimension 1 to 40% said line roller in axial dimension.

5. The fishing line guide mechanism according to claim 3, wherein said bevel is in the range of 0.5 to 10 degrees.

6. The fishing line guide mechanism according to claim 1, wherein the acute angle defining said stationary shaft bias is less than 20°.

7. For a spinning reel having a spool line-winding rotor from which a pair of diametrically opposed rotor arms extend axially, a fishing line guide mechanism mounted on either one of a pair of bail supports pivotably mounted endwise on the respective rotor arms for pivoting between line-winding and line-releasing positions and comprising:

a stationary shaft fixed endwise to the one bail support at a bias toward the line-releasing position of the bail supports with respect to the rotor rotational axis;

a stationary shaft cover retained endwise on said stationary shaft opposite its fixed end at a spaced-apart interval from the one bail support;

a line roller rotatably supported on said stationary shaft in the spaced-apart interval between the one bail support and said stationary shaft cover, said line roller having a reverse-twist generating configuration including a first positioning surface adjacent said stationary shaft cover for initial contact with fishing line being wound under tension onto the spool, and a second positioning surface formed to displace slightly toward the one bail support fishing line extending from said line roller and being wound under tension onto the spool; wherein said stationary shaft bias is defined as an acute angle between a line parallel to the line-roller rotational axis and the fishing line when substantially parallel to the rotor axis, in a plane containing the line both parallel to the line-roller rotational axis and intersecting that point where the fishing line when substantially parallel to the rotor axis last contacts the line roller, and said stationary shaft bias and the reverse-twist generating configuration of said line roller constitute a reverse-twist generating means for imparting reverse twist to fishing line being wound under tension onto the spool by urging the fishing line toward said first positioning surface.

8. The fishing line guide mechanism according to claim 7, wherein said first positioning surface is a line-ward face of a maximum-diameter flange formed adjacent said stationary shaft cover.

9. The fishing line guide mechanism according to claim 8, wherein said second positioning surface configures an inflection point on said line roller as its smallest-diameter circumference.

10. The fishing line guide mechanism according to claim 9, wherein radial height between the inflection point and the line-ward face at its radially outermost point of fishing-line contact is 1 to 15% the diameter of the maximum-diameter flange.

11. The fishing line guide mechanism according to claim 8, wherein the line-ward face of the maximum-diameter flange is slightly inclined toward said stationary shaft cover with respect to a plane perpendicular to the line-roller rotational axis.

12. The fishing line guide mechanism according to claim 11, wherein the inclination of the line-ward face of the maximum-diameter flange runs 1 to 15% of said line roller axially.

13. The fishing line guide mechanism according to claim 12, wherein the line-ward face at its radially outermost point of fishing-line contact is chamfered.

14. The fishing line guide mechanism according to claim 13, wherein the line-ward face is chamfered to round the radially outermost point of fishing-line contact at a radius of 0.1 to 0.5 mm.

15. The fishing line guide mechanism according to claim 12, wherein the first and second positioning surfaces meet in a corner angular in cross-section.

16. The fishing line guide mechanism according to claim 8, wherein the line-ward face of the maximum-diameter flange is perpendicular to said stationary shaft.

17. The fishing line guide mechanism according to claim 7, the pair of bail supports pivotably mounted on the rotor arms therein defining a bail pivotal axis through their pivotal centers, wherein said stationary shaft further is disposed at an acute angle with respect to a line tangential to a rotor-concentric circle and perpendicular to a plane containing the bail pivotal axis, urging the fishing line against said maximum diameter flange.

* * * * *